United States Patent
Tonisson et al.

(10) Patent No.: US 8,260,089 B2
(45) Date of Patent: Sep. 4, 2012

(54) ORIENTATION ADAPTED ALIASING CANCELLATION

(75) Inventors: Alan Valev Tonisson, Beecroft (AU);
Nagita Mehrseresht, Castle Hill (AU);
Andrew James Dorrell, East Blaxland (AU)

(73) Assignee: Canon Kabushiki Kaisha, Tokyo (JP)

( * ) Notice: Subject to any disclaimer, the term of this patent is extended or adjusted under 35 U.S.C. 154(b) by 943 days.

(21) Appl. No.: 12/273,228

(22) Filed: Nov. 18, 2008

(65) Prior Publication Data

US 2009/0161990 A1    Jun. 25, 2009

(30) Foreign Application Priority Data

Dec. 19, 2007    (AU) .............................. 2007249113

(51) Int. Cl.
| | |
|---|---|
| G06K 9/46 | (2006.01) |
| G06K 9/66 | (2006.01) |
| G06K 9/32 | (2006.01) |
| G06K 9/36 | (2006.01) |
| G06K 9/40 | (2006.01) |
| G06K 1/00 | (2006.01) |
| H04N 5/262 | (2006.01) |
| H04N 7/01 | (2006.01) |
| H04N 11/20 | (2006.01) |
| G06F 3/12 | (2006.01) |
| G06F 15/00 | (2006.01) |

(52) U.S. Cl. ........ 382/300; 382/190; 382/261; 382/269; 382/276; 348/240.2; 348/441; 358/1.1

(58) Field of Classification Search .................. 382/128, 382/141, 153, 173, 181, 190, 254, 260–261, 382/264, 266, 268–269, 275–276, 293–301; 348/240.2, 441, 446–452; 345/418, 581, 345/611; 358/1.1–1.2
See application file for complete search history.

(56) References Cited

U.S. PATENT DOCUMENTS

| | | | |
|---|---|---|---|
| 2003/0053669 A1* | 3/2003 | Suri et al. ...................... | 382/130 |
| 2003/0118236 A1* | 6/2003 | Kung et al. ................... | 382/180 |
| 2004/0161141 A1* | 8/2004 | Dewaele ....................... | 382/132 |
| 2008/0008369 A1* | 1/2008 | Koptenko et al. ............. | 382/128 |
| 2008/0155000 A1 | 6/2008 | Mehrseresht et al. ........ | 708/290 |

OTHER PUBLICATIONS

Xiaohua Yu; Bryan, B.S.; Sederberg, T.W.; , "Image reconstruction using data-dependent triangulation," Computer Graphics and Applications, IEEE , vol. 21, No. 3, pp. 62-68, May/Jun. 2001.*

Qing Wang; Ward, R.; Hongjian Shi; , "Isophote estimation by cubic-spline interpolation," Image Processing. 2002. Proceedings. 2002 International Conference on , vol. 3, No., pp. III-40-III-404 vol. 3, 2002.*

(Continued)

*Primary Examiner* — Anand Bhatnagar
*Assistant Examiner* — Nathan Bloom
(74) *Attorney, Agent, or Firm* — Fitzpatrick, Cella, Harper & Scinto

(57) ABSTRACT

A method (700) of determining an image value at a sample position of an output image, is disclosed. The method (700) comprises the steps of determining orientation of an isophote (e.g., 1010) passing through the output sample position and determining a period of intensity variation along the isophote (1010). The method (700) determines the image value at the sample position of the output image based on the period of intensity variation and outputs the determined image value at the sample position of the output image.

14 Claims, 12 Drawing Sheets

OTHER PUBLICATIONS

Zhan Yi; Wang Minghui; Li Meng; , "An Isophote-Oriented Image Interpolation Method," Computer Science and Computational Technology, 2008. ISCSCT '08. International Symposium on , vol. 1, No., pp. 723-726, Dec. 20-22, 2008.*

Morse, B.S.; Schwartzwald, D.; , "Isophote-based interpolation," Image Processing, 1998. ICIP 98. Proceedings. 1998 International Conference on , vol., No., pp. 227-231 vol. 3, Oct. 4-7, 1998.*

Qing et al., "A New Orientation-adaptive Interpolation Method", IEEE Transactions on Image Processing, 16(4), pp. 889-900 (Apr. 2007).

Rataj A., " An Effective Edge-directed Frequency filter for Removal of Aliasing in Unsampled Images", Machine Graphics and Vision International Journal, 15(3), pp. 585-598 (Feb. 2006).

Examiner's Report No. 2 on Australian Patent Application No. 2007249113, May 16, 2011.

Qing W. et al., "A new orientation-adaptive interpolation method", IEEE Transactions on Image Processing, vol. 16, Issue 4, Apr. 2007, pp. 889-900.

Rataj A., "An effective edge-directed frequency filter for removal of aliasing in upsampled images", Machine Graphics & Vision International Journal, vol. 15, Issue 3, Feb. 2006, pp. 585-598.

* cited by examiner

ORIENTATION ADAPTED ALIASING CANCELLATION

CROSS-REFERENCE TO RELATED PATENT APPLICATIONS

This application claims the right of priority under 35 U.S.C. § 119 based on Australian Patent Application No. 2007249113, filed 19 Dec. 2007, which is incorporated by reference herein in its entirety as if fully set forth herein.

FIELD OF INVENTION

The present invention relates to digital image processing and, in particular, to a method and apparatus for processing an input image including determining an image sample of an output image having reduced aliasing. The present also relates to a computer program product including a computer readable medium having recorded thereon a computer program for processing an input image including determining an image sample of an output image having reduced aliasing.

DESCRIPTION OF BACKGROUND ART

When a continuous image is sampled (e.g. at the sensor in a digital camera), if the frequency components of the continuous image are too high, aliasing will occur in the sampled image. Aliasing occurs when an original image contains frequencies that are higher than $(2 s)^{-1}$ where s represents spacing between samples. Unfortunately, low-pass filtering an image blurs the image, so images are often slightly under-sampled to make the sampled image appear sharper. This applies to both natural images and particularly to computer generated images.

Small amounts of aliasing are not very visible. However, when an image is resampled at a higher resolution, the aliasing in the original image is magnified and becomes much more visible and objectionable in the output image. Such artefacts are especially visible along edges in the image data, where they are sometimes referred to as "jaggies". Jaggies are a significant cause of quality degradation in up-scaled images.

Many methods have been proposed to deal with the problem of jaggies based on modifying an interpolation process in the presence of edges. For example, the sharpness of an interpolating kernel may be varied in edge regions or a kernel may be selected that is stretched or otherwise oriented to match the orientation of the edge. In some methods, pixel patterns are matched to dictionaries that provide specific rules for interpolating the missing sample. Machine learning methods have been proposed by some as a means of generating these rules while others use hand coded rules. Many of these methods suffer from the fact that edge orientations are quantized and so create visible artefacts in output images at the boundaries of regions where different kernels have been applied. Others of the methods are constrained by the fact that their rules can only be applied to fixed rate interpolation.

All of the above conventional methods suffer from unpredictable artefacts that are a result of their empirical or arbitrary construction. To prevent such artefacts in the output image it is necessary to moderate the use of the methods, often via separate sets of rules which add further unpredictability and complexity and prevent optimal image quality being achieved.

More theoretical methods that optimise kernel selection to data have been proposed but are typically iterative and remain too complex to implement in hardware for consumer electronics.

Thus a need exists for a method which reduces the "jaggie" artefacts caused by image up-sampling, and which is simple whilst being adaptable to a continuous range of edge orientations and rescaling rates. A further need exists for a method which provides a predictable failure mode so that secondary artefacts can be prevented.

SUMMARY OF THE INVENTION

It is an object of the present invention to substantially overcome, or at least ameliorate, one or more disadvantages of existing arrangements.

According to one aspect of the present invention there is provided a method of determining an image value at a sample position of an output image, said method comprising the steps of:

determining orientation of an isophote passing through the output sample position;

determining a period of intensity variation along the isophote; determining the image value at the sample position of the output image based on the period of intensity variation; and outputting the determined image value at the sample position of the output image.

According to another aspect of the present invention there is provided a method of determining an image value at a sample position of an output image, said method comprising the steps of:

determining orientation of an isophote passing through the output sample position;

determining a period of intensity variation along the isophote;

determining curvature of the isophote in a neighbourhood of the sample position based on the period of intensity variation;

determining the image value at the sample position of the output image depending on whether the curvature is within a first range or a second range; and outputting the determined image value at the sample position of the output image.

According to still another aspect of the present invention there is provided an apparatus for determining an image value at a sample position of an output image, said apparatus comprising:

orientation determining means for determining orientation of an isophote passing through the output sample position;

period determining means for determining a period of intensity variation along the isophote; determining the image value at the sample position of the output image based on the period of intensity variation; and output means for outputting the determined image value at the sample position of the output image.

According to still another aspect of the present invention there is provided an apparatus for determining an image value at a sample position of an output image, said apparatus comprising:

orientation determining means for determining orientation of an isophote passing through the output sample position;

period determining means for determining a period of intensity variation along the isophote;

curvature determining means for determining curvature of the isophote in a neighbourhood of the sample position based on the period of intensity variation;

image value determining means for determining the image value at the sample position of the output image depending on whether the curvature is within a first range or a second range; and output means for outputting the determined image value at the sample position of the output image.

According to still another aspect of the present invention there is provided a computer readable storage medium, having a program recorded on the medium, where the program is configured to make a computer execute a process for determining an image value at a sample position of an output image, said program comprising:

code for determining orientation of an isophote passing through the output sample position;

code for determining a period of intensity variation along the isophote; determining the image value at the sample position of the output image based on the period of intensity variation; and code for outputting the determined image value at the sample position of the output image.

According to still another aspect of the present invention there is provided a computer readable storage medium, having a program recorded on the medium, where the program is configured to make a computer execute a process for determining an image value at a sample position of an output image, said process comprising:

code for determining orientation of an isophote passing through the output sample position;

code for determining a period of intensity variation along the isophote;

code for determining curvature of the isophote in a neighbourhood of the sample position based on the period of intensity variation;

code for determining the image value at the sample position of the output image depending on whether the curvature is within a first range or a second range; and code for outputting the determined image value at the sample position of the output image.

According to still another aspect of the present invention there is provided a system for determining an image value at a sample position of an output image, said system comprising:

a memory for storing data and a computer program; and a processor coupled to said memory executing said computer program, said computer program comprising instructions for:

determining orientation of an isophote passing through the output sample position;

determining a period of intensity variation along the isophote; determining the image value at the sample position of the output image based on the period of intensity variation; and outputting the determined image value at the sample position of the output image.

According to still another aspect of the present invention there is provided a system for determining an image value at a sample position of an output image, said system comprising:

a memory for storing data and a computer program; and a processor coupled to said memory executing said computer program, said computer program comprising instructions for:

determining orientation of an isophote passing through the output sample position;

determining a period of intensity variation along the isophote;

determining curvature of the isophote in a neighbourhood of the sample position based on the period of intensity variation;

determining the image value at the sample position of the output image depending on whether the curvature is within a first range or a second range; and outputting the determined image value at the sample position of the output image.

Other aspects of the invention are also disclosed.

BRIEF DESCRIPTION OF THE DRAWINGS

One or more embodiments of the invention will now be described with reference to the following drawings, in which.

DETAILED DESCRIPTION OF EMBODIMENTS OF THE INVENTION

Figure 1:
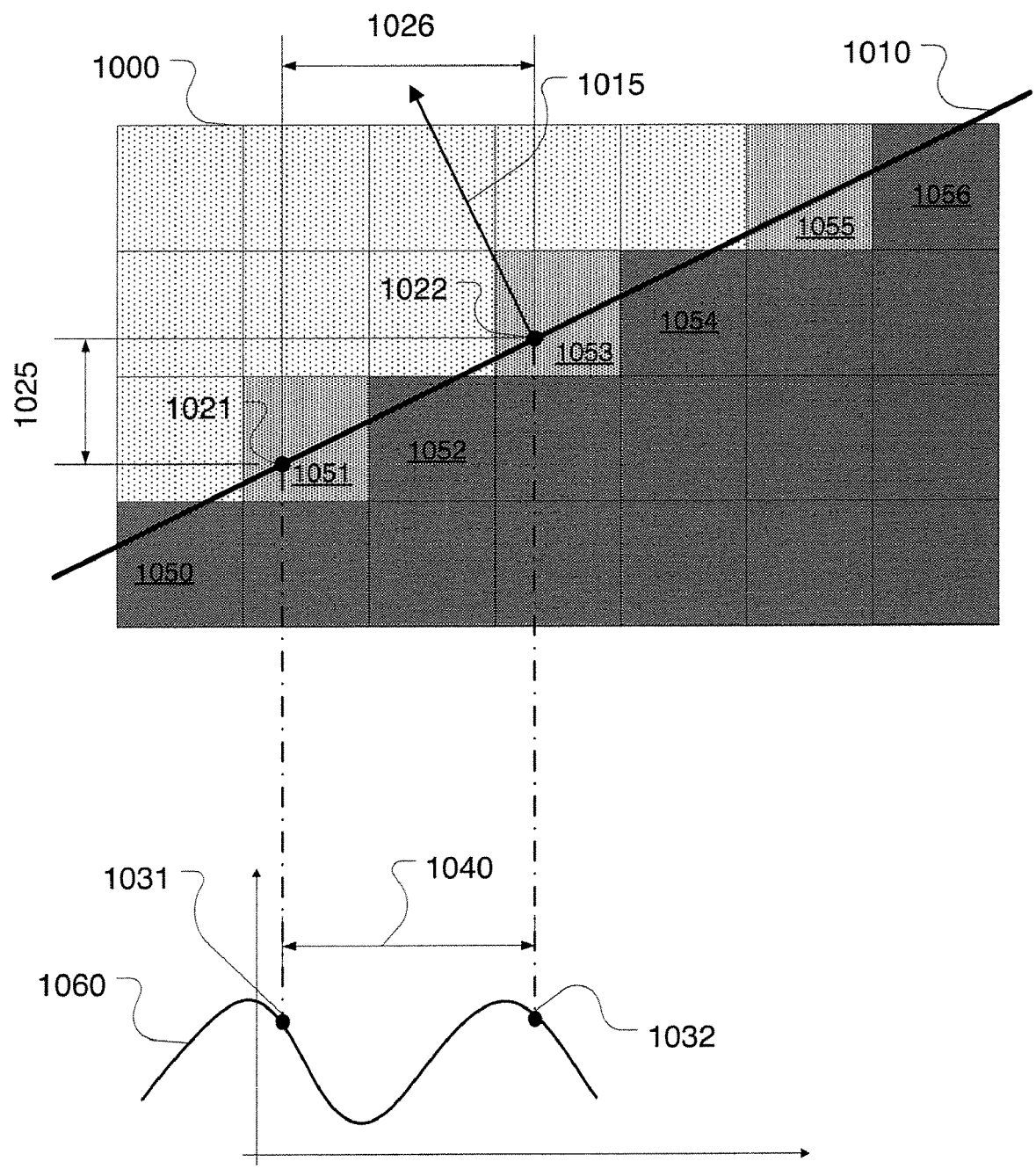
FIG. 1 shows a sampled image of an edge and includes a plot of intensity along an isophote of the edge.

Where reference is made in any one or more of the accompanying drawings to steps and/or features, which have the same reference numerals, those steps and/or features have for the purposes of this description the same function(s) or operation(s), unless the contrary intention appears.

When an image containing an oriented high frequency feature such as an edge is sampled using rectangular sampling, aliasing appears as a repeated stepping pattern along the feature. When interpolation is used to reconstruct a higher resolution output image from such a sampled image, the aliasing produces a periodic variation of intensity in the reconstructed output image along lines that are of constant intensity in the original image. Such lines of constant intensity will be referred to herein as "isophotes".

FIG. 1 shows a sampled image 1000 of an edge with pixels 1051 to 1056 representing samples taken close to the edge. Along a line 1010 parallel to the edge, intensity in the original image is constant. Accordingly, the line 1010 is an isophote. However, the intensity of an up-sampled output image reconstructed from the sampled image 1000 varies periodically about the actual intensity of the isophote 1010 as depicted in a plot 1060 of intensity along the isophote 1010. Two points 1021 and 1022 on the isophote 1010 are shown and their intensities in the reconstructed image correspond to the points 1031 and 1032 in the intensity plot 1060. As seen in FIG. 1, the points 1031 and 1032 have equal intensity and are separated by a distance along the isophote 1010 equal to an "aliasing period" 1040. The aliasing period 1040 has components dy 1025 and dx 1026 in the vertical and horizontal directions, respectively. The aliasing period 1040 is the period of intensity variation along the isophote 1010, where the intensity variation results from aliasing. Vector D=(dx,dy) is referred to as a "period vector" of the aliasing period.

For isophote orientations where abs(dx)>abs(dy) (i.e., corresponding to angles in the range ±45 degrees from horizontal), the aliasing period vector has a vertical component equal to the vertical sample spacing and a horizontal component determined by the orientation of the isophote. Orientations in the range ±45 degrees from horizontal are referred to herein as "near horizontal", for convenience.

For isophote orientations where abs(dy)>abs(dx) (i.e., corresponding to angles in the range ±45 degrees from vertical) the aliasing period vector has a horizontal component equal to the horizontal sample spacing and a vertical component determined by the orientation of the isophote. Orientations in the range ±45 degrees from vertical are referred to herein as "near vertical" for convenience. In practice, isophote orientation may be measured as a function of intensity gradient, which may be determined using convolution operators.

A continuous image may be treated as a continuous, differentiable real valued function I(x, y) of two variables. The function I(x, y) may be referred to as an intensity function. Such an intensity function is assumed to be differentiable as this will always be true for real world images as there is some degree of blurring in any optical system, which is equivalent to smoothing the image intensity. Lines of constant intensity (e.g. edges) are always perpendicular to the direction of maximum variation in intensity.

In FIG. 1, a gradient vector 1015 is shown at the point 1022. The gradient vector 1015 is defined in accordance with Equation (1) as follows:

$$G = (g_x, g_y) = \left(\frac{\partial I}{\partial x}, \frac{\partial I}{\partial y}\right) \quad (1)$$

The gradient vector G always points in the direction of maximum increase in intensity which is always perpendicular to the lines of constant intensity (e.g., the isophote 1010). Thus, for near horizontal isophotes, the period vector is determined in accordance with Equation (2) as follows:

$$D=(d_x,d_y)=(-g_y/g_x,1) \quad (2)$$

where $(g_x, g_y)$ is the gradient vector 1015 representing the orientation of the isophote such as the isophote 1010. For near vertical isophotes (i.e. when abs(gx)>abs(gy)), the period vector is determined in accordance with Equation (3) as follows:

$$D=(d_x,d_y)=(1,-g_x/g_y) \quad (3)$$

Note that when $g_x=g_y$ (i.e. when the isophote 1010 is 45° to the sampling axes), the period vector is (−1, 1) or (1, −1), which are equivalent because the period vector may be reversed without changing the meaning of the period vector. When $g_x=-g_y$, then either Equation (2) or Equation (3) gives an aliasing period vector of (1, 1). Equation (2) and (3) are valid for any isophote lines at any orientation except isophotes that are exactly horizontal or exactly vertical because the aliasing period approaches infinity as the orientation of the isophotes approach the orientation of either sampling axis.

Figure 2A:
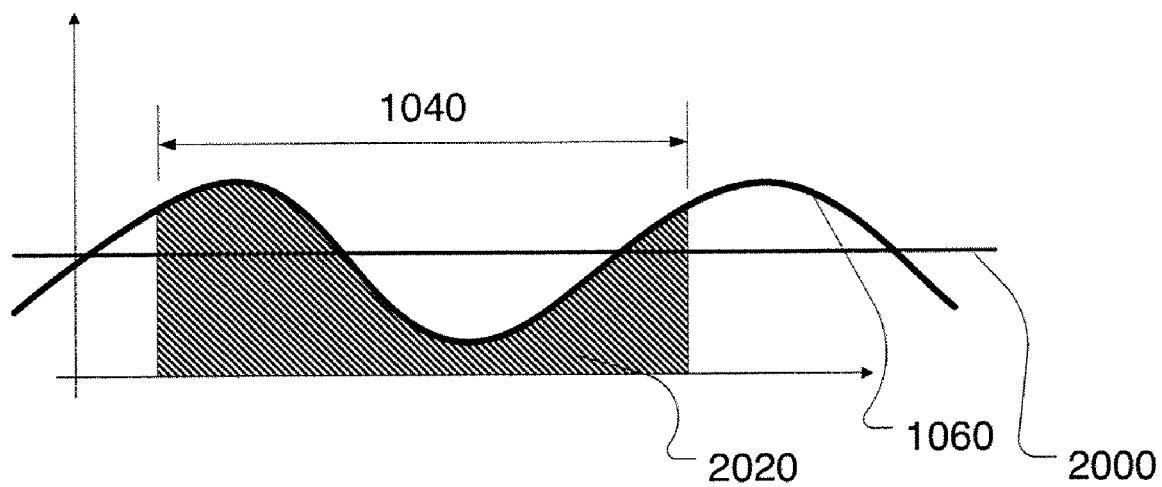
FIG. 2A shows the intensity plot of FIG. 1 with an area under the intensity profile shaded.
Figure 2B:
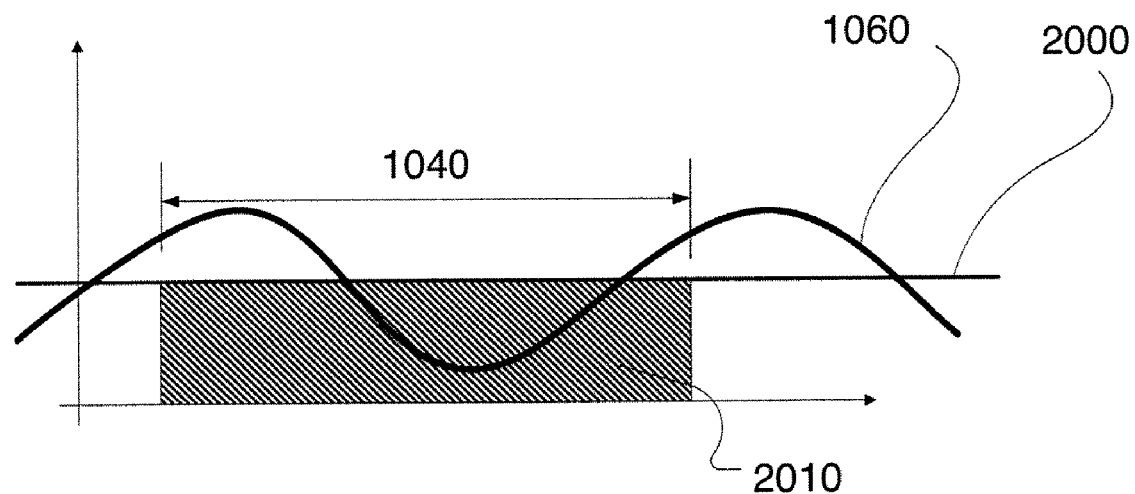
FIG. 2B shows the plot of FIG. 1 with an area under an isophote line shaded.

Since the aliasing period may be determined, and noting that the variation occurs about the ideal intensity 2000 for the isophote 1010, it is possible to reconstruct the ideal intensity by integrating the interpolated intensity along one period as shown in FIGS. 2A and 2B. The plot 1060 of FIG. 1 is shown in FIG. 2A and FIG. 2B. The plot 1060 is the intensity profile of the reconstructed output image along a line corresponding to the isophote 1010 of the original image. The ideal intensity 2000 of the isophote 1010 is equal to A/L where A is the area 2010 under the isophote line 1010 integrated over an interval of length L equal to the aliasing period 1040. The area 2010 is equivalent to the area 2020 under the intensity profile 1060 as shown in FIG. 2A.

Integration over a period of oscillation is one method of achieving what is essentially a selective filtering at the specific frequency of the intensity variation along the isophote 1010. This selective filtering may otherwise be achieved with a suitably designed finite impulse response (FIR) or infinite impulse response (IIR) filter. While a suitably designed FIR or IIR filter may be useful if applied to an image after the image has been up-sampled such filters are not as easily implemented in the context of an up-sampler.

Figure 3:
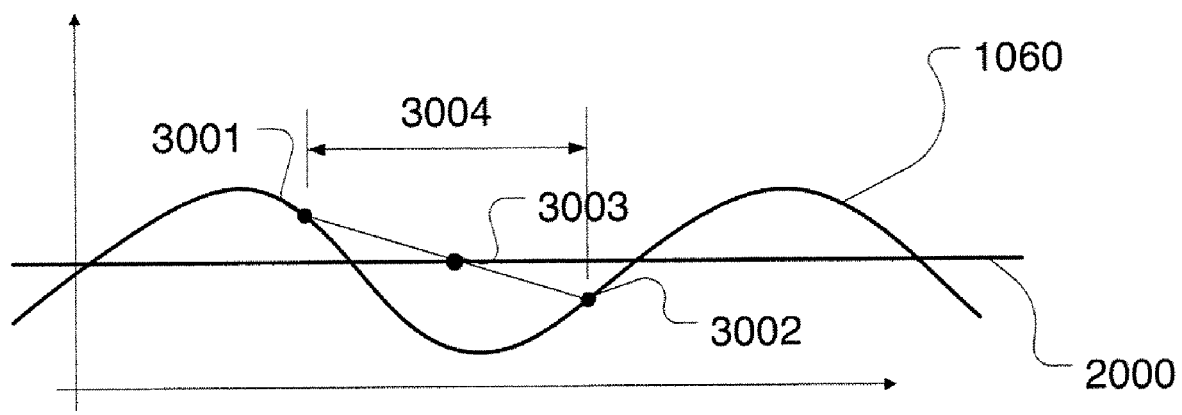
FIG. 3 shows an example how an approximation of an original value of an isophote may be determined.

FIG. 3 shows how an approximation 3003 of an original value along an isophote may be determined. The original value may be determined by averaging two interpolated values 3001, 3002 on the intensity profile 1060 at points on the isophote spaced apart by a distance 3004. The distance 3004 is equal to half of the aliasing period. Since the points 3001 and 3002 are 180° out of phase with respect to each other, variation due to aliasing in each of the two points 3001 and 3002 tends to cancel out to produce a value close to the ideal value 2000.

Figure 4:
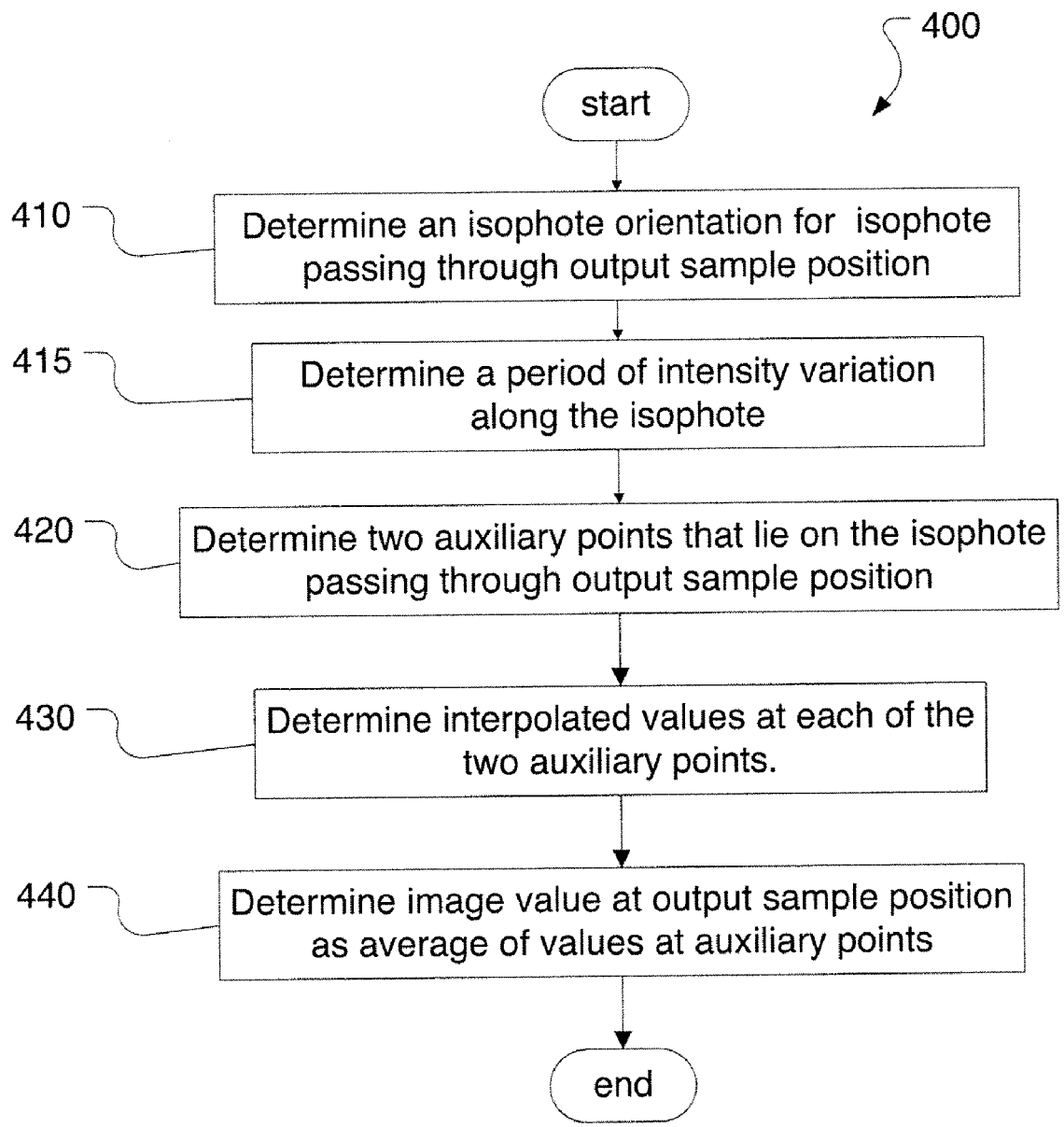
FIG. 4 is a flow diagram showing a method of determining a resampled image value at a sample position in an output image.

FIG. 4 is a flowchart showing a method 400 of determining a resampled image value at a sample position in an output image, using the approximation (e.g., 3003) described above. The method 400 may be implemented using a computer system 1100, such as that shown in FIG. 11 wherein the processes of FIGS. 1 to 10 may be implemented as software, such as one or more application programs executable within the computer system 1100. In particular, the steps of the method 1100 are effected by instructions in the software that are carried out within the computer system 1100. The instructions may be formed as one or more code modules, each for performing one or more particular tasks. The software may also be divided into two separate parts, in which a first part and the corresponding code modules performs the described methods and a second part and the corresponding code modules manage a user interface between the first part and the user. The software may be stored in a computer readable medium, including the storage devices described below, for example. The software is loaded into the computer system 1100 from the computer readable medium, and then executed by the computer system 1100. A computer readable medium having such software or computer program recorded on it is a computer program product. The use of the computer program product in the computer system 1100 preferably effects an advantageous apparatus for implementing the described methods.

Figure 11:
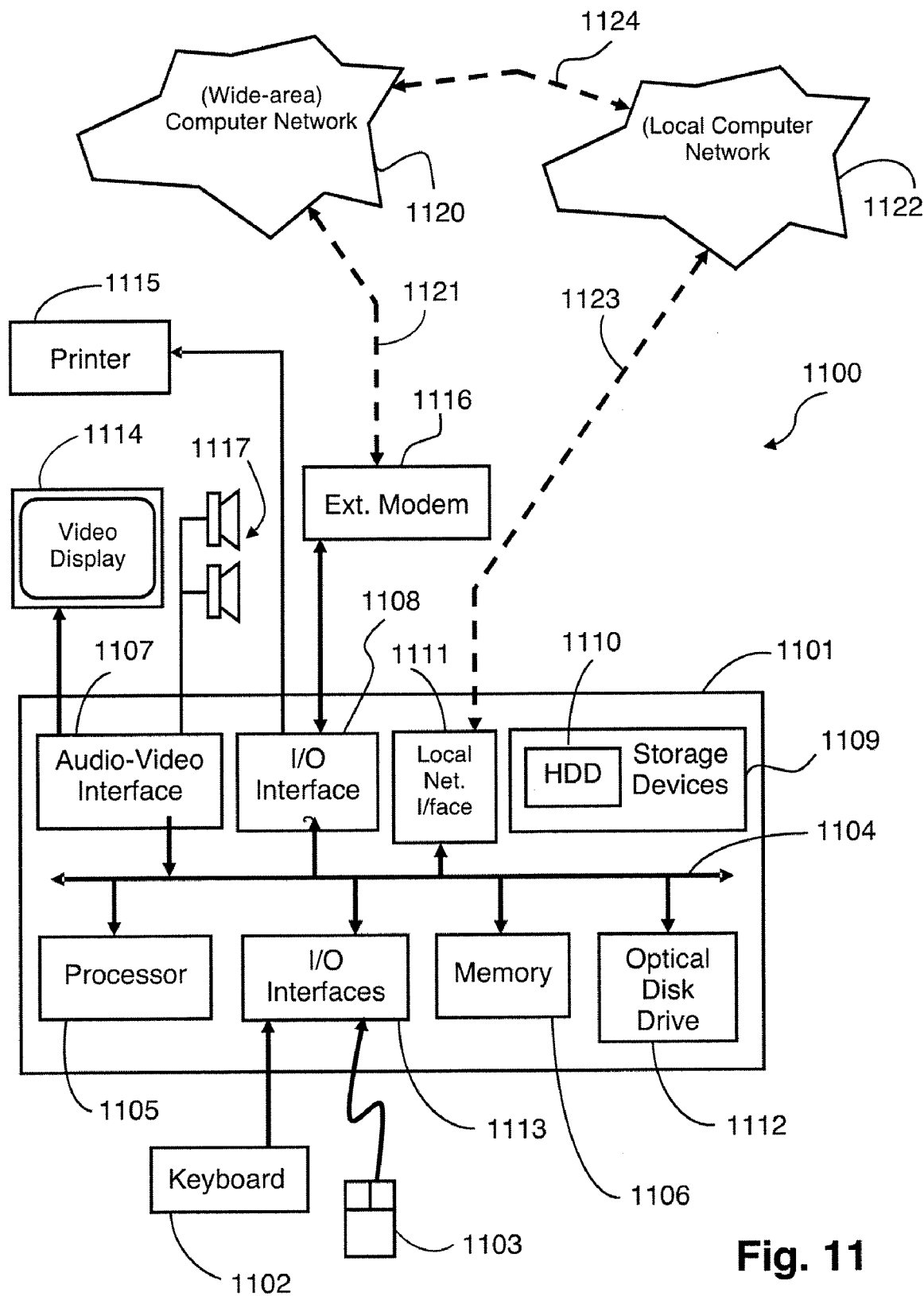
FIG. 11 is schematic block diagram of a computer system upon which arrangements described herein may be practiced.

As seen in FIG. 11, the computer system 1100 is formed by a computer module 1101, input devices such as a keyboard 1102 and a mouse pointer device 1103, and output devices including a printer 1115, a display device 1114 and loudspeakers 1117. An external Modulator-Demodulator (Modem) transceiver device 1116 may be used by the computer module 1101 for communicating to and from a communications network 1120 via a connection 1121. The network 1120 may be a wide-area network (WAN), such as the Internet or a private WAN. Where the connection 1121 is a telephone line, the modem 1116 may be a traditional "dial-up" modem. Alternatively, where the connection 1121 is a high capacity (eg: cable) connection, the modem 1116 may be a broadband modem. A wireless modem may also be used for wireless connection to the network 1120.

The computer module 1101 typically includes at least one processor unit 1105, and a memory unit 1106 for example formed from semiconductor random access memory (RAM) and read only memory (ROM). The module 1101 also includes an number of input/output (I/O) interfaces including an audio-video interface 1107 that couples to the video display 1114 and loudspeakers 1117, an I/O interface 1113 for the keyboard 1102 and mouse 1103 and optionally a joystick (not illustrated), and an interface 1108 for the external modem 1116 and printer 1115. In some implementations, the modem 1116 may be incorporated within the computer module 1101, for example within the interface 1108. The computer module 1101 also has a local network interface 1111 which, via a connection 1123, permits coupling of the computer system 1100 to a local computer network 1122, known as a Local Area Network (LAN). As also illustrated, the local network 1122 may also couple to the wide network 1120 via a connection 1124, which would typically include a so-called "firewall" device or similar functionality. The interface 1111 may be formed by an Ethernet™ circuit card, a wireless Bluetooth™ or an IEEE 802.11 wireless arrangement.

The interfaces 1108 and 1113 may afford both serial and parallel connectivity, the former typically being implemented according to the Universal Serial Bus (USB) standards and having corresponding USB connectors (not illustrated). Storage devices 1109 are provided and typically include a hard disk drive (HDD) 1110. Other devices such as a floppy disk drive and a magnetic tape drive (not illustrated) may also be used. An optical disk drive 1112 is typically provided to act as a non-volatile source of data. Portable memory devices, such optical disks (eg: CD-ROM, DVD), USB-RAM, and floppy disks for example may then be used as appropriate sources of data to the system 1100.

The components 1105, to 1113 of the computer module 1101 typically communicate via an interconnected bus 1104 and in a manner which results in a conventional mode of operation of the computer system 1100 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 1110 and read and controlled in execution by the processor 1105. Intermediate storage of such programs and any data fetched from the networks 1120 and 1122 may be accomplished using the semiconductor memory 1106, possibly in concert with the hard disk drive 1110. In some instances, the application programs may be supplied to the user encoded on one or more CD-ROM and read via the corresponding drive 1112, or alternatively may be read by the user from the networks 1120 or 1122. Still further, the software can also be loaded into the computer system 1100 from other computer readable media. Computer readable media refers to any storage medium that participates in providing instructions and/or data to the computer system 1100 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1101. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 1114. Through manipulation of the keyboard 1102 and the mouse 1103, a user of the computer system 1100 and the application may manipulate the interface to provide controlling commands and/or input to the applications associated with the GUI(s).

The method 1100 may alternatively be implemented in dedicated hardware such as one or more integrated circuits performing the functions or sub functions of the method 1100. Such dedicated hardware may include graphic processors, digital signal processors, or one or more microprocessors and associated memories.

The method 400 achieves an edge reconstruction as a part of an interpolation process by substantially suppressing the intensity variation along isophote lines resulting from aliasing in a sampled input image such as the image 1000.

Figure 12:
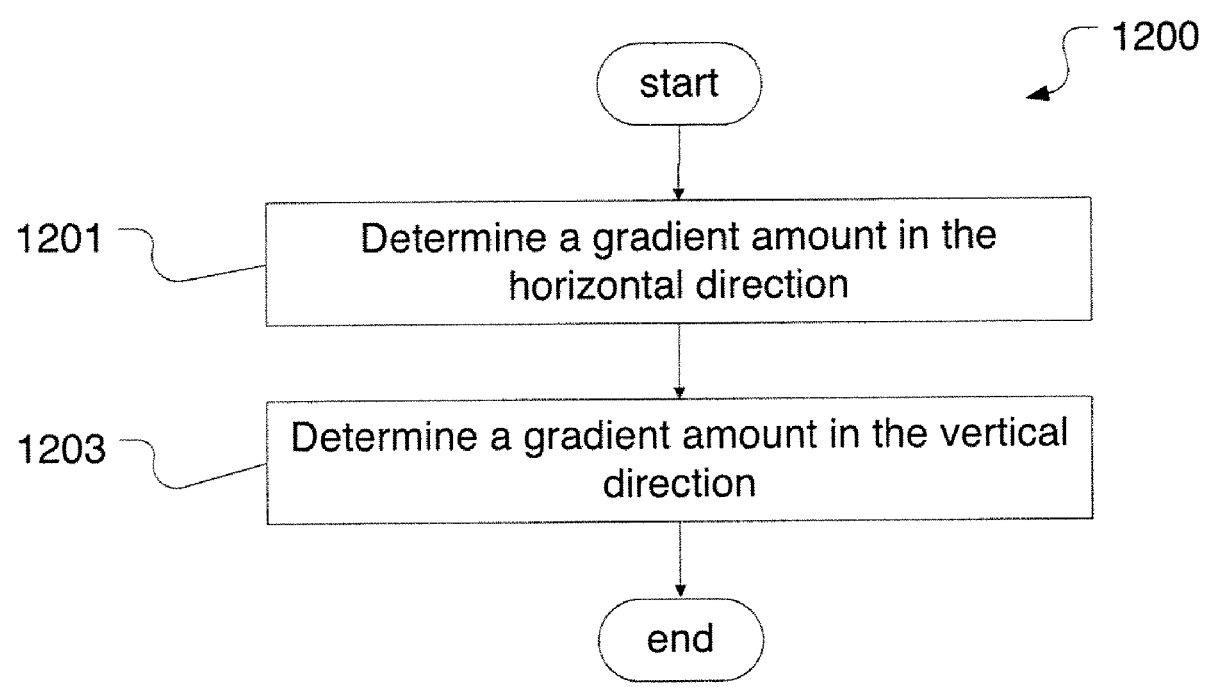
FIG. 12 is a flow diagram showing a method of determining orientation of an isophote.

The method 400 begins at step 410 where the processor 1105 performs the step of determining an isophote orientation $(g_x, g_y)$ for an isophote passing through the sample position in the output image. A method 1200 of determining an isophote orientation represented by the gradient $(g_x, g_y)$ for an isophote passing through an output sample position, as executed at step 410, will be described in detail below with reference to FIG. 12.

At the next step 415 of the method 400, the processor 1105 performs the step of determining a period of intensity variation along the isophote (i.e., the aliasing period 1040). As described above, the aliasing period (e.g., 1040) has components dy (e.g., 1025) and dx (e.g., 1026) in the vertical and horizontal directions, respectively.

The determination of the isophote orientation $(g_x, g_y)$ and period of intensity variation along the isophote, at steps 410 and 415, will be further described by way of example below with reference to FIG. 6.

The method 400 continues at the next step 420 where the processor 1105 uses the two components dy and dx of the period vector corresponding to the aliasing period, to perform the step of determining two auxiliary points lying on the isophote passing through the desired output sample position.

In the following steps 430 and 440, the processor 1105 determines the image value at the sample position of the output image based on the aliasing period (i.e., the period of intensity variation). In particular, at step 430, the processor 1105 performs the step of determining interpolated values at each of the two auxiliary points using a bicubic interpolation method. These auxiliary points are separated by a distance equal to half of the aliasing period. Locations $P_1$ and $P_2$ of the auxiliary points may be determined in accordance with Equation (4) and (5) as follows:

$$P_1 = P + D/4 \qquad (4)$$

$$P_2 = P - D/4 \qquad (5)$$

where P=($x_0$, $y_0$) is the output sample position and D=($d_x$,$d_y$) is the period vector measured at the output sample position P according to equations (2) or (3). A bicubic interpolation method is used to determine the interpolated image values at the two auxiliary points ($P_1$ and $P_2$).

The method 400 concludes at step 440 where the processor 1105 performs the step of determining the average of the two interpolated values. The average of the interpolated values at the two auxiliary points is output as the resampled image value at the sample position of the output image.

Following step 440, the processor 1105 may perform the step of outputting the determined image value at the sample position of the output image. The determined image value may be stored in memory 1106, displayed on the display device 1114 or printed on the printer 1115, for example. The method 1200 of determining an isophote orientation ($g_x$, $g_y$) at an output sample position P, as executed at step 410, will now be described. As described above, isophote orientation may be measured as a function of intensity gradient, which may be determined using convolution operators. The method 1200 is closely related to cubic interpolation which will now be described by way of example with reference to FIG. 5.

Figure 5:
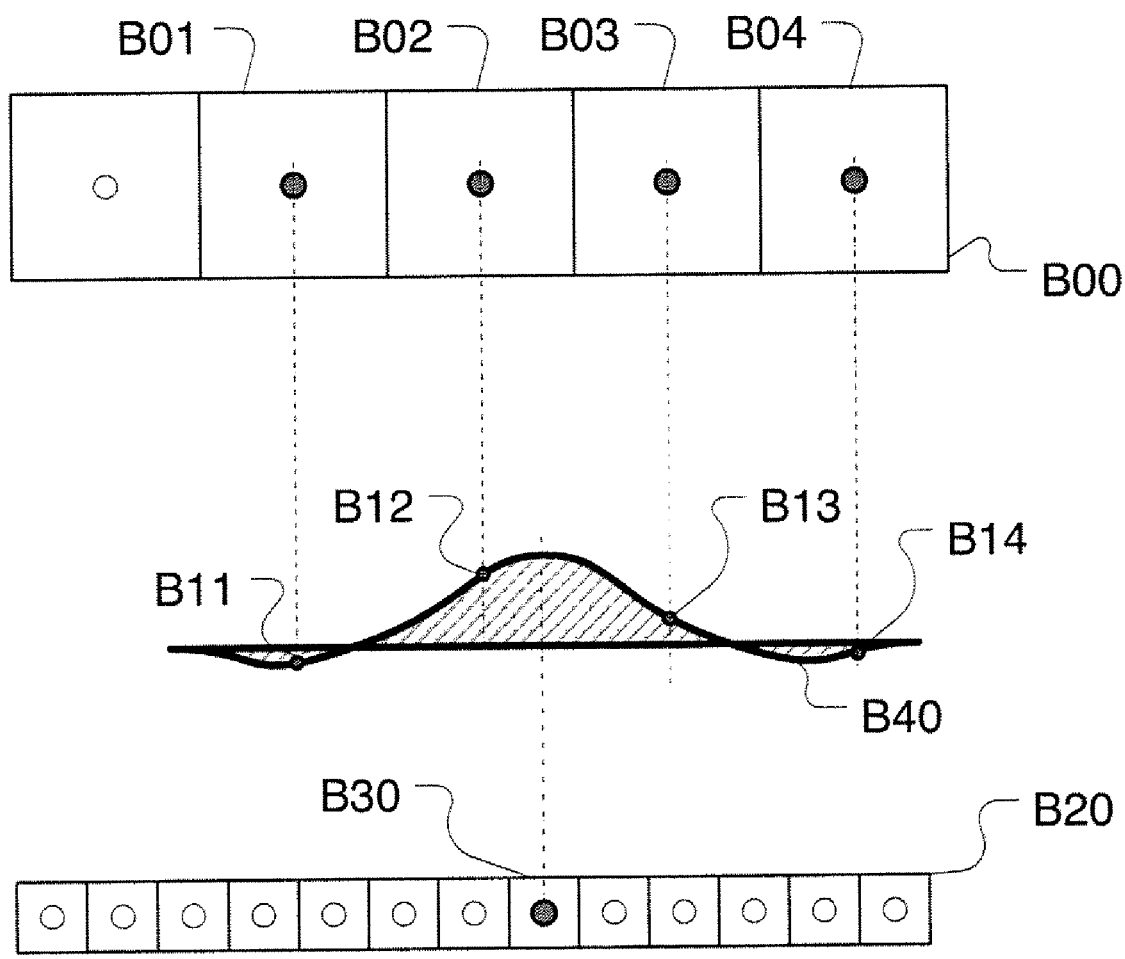
FIG. 5 is a diagram illustrating cubic interpolation.

In cubic interpolation, a set of neighbouring input samples B01, B02, B03, B04 from an input signal B00 representing at least a portion of an input image are combined using a weighted sum to generate a single output sample B30 of an output signal B20 representing at least a portion of an output image. In the case of up-sampling, as shown in FIG. 5, the density of samples in the output signal B20 is greater than the density of samples in the input signal B00. The weights B11, B12, B13, B14 applied to the input samples B01, B02, B03 and B04 respectively are determined from a continuous cubic function B40 centred at the position of the output sample B30 then evaluated at offsets corresponding to the relative positions of each input sample. The cubic interpolation described with reference to FIG. 5 may be referred to as continuous convolution. The standard cubic function is defined in accordance with Equation (6) as follows:

$$C(x, a) = \begin{cases} (a+2)|x|^3 - (a+3)|x|^2 + 1 & 0 \le |x| < 1 \\ a|x|^3 - 5a|x|^2 + 8a|x| - 4a & 1 \le |x| < 2 \\ 0 & 2 \le |x| \end{cases} \quad (6)$$

where x is the offset from the centre point of the cubic function and ranges between −2 to +2 and a is a free parameter which is typically selected to be −0.5. The cubic interpolation is applied in two or more dimensions by separable application to each dimension.

In order to determine a gradient amount, a modified cubic function is first defined. The modified cubic function is a stretched version of the standard cubic function and is defined in accordance with Equation (7) as follows:

$$K(x, a) = \frac{1}{2} \begin{cases} (a+2)\left|\frac{x}{2}\right|^3 - (a+3)\left|\frac{x}{2}\right|^2 + 1 & 0 \le |x| < 2 \\ a\left|\frac{x}{2}\right|^3 - 5a\left|\frac{x}{2}\right|^2 + 8a\left|\frac{x}{2}\right| - 4a & 2 \le |x| < 4 \\ 0 & 4 \le |x| \end{cases} \quad (7)$$

Then a matching derivative kernel is defined in accordance with Equation (8) as follows:

$$K'(x, a) = \frac{1}{4} \text{sgn}(x) \begin{cases} 3(a+2)\left|\frac{x}{2}\right|^2 - 2(a+3)\left|\frac{x}{2}\right| & 0 \le |x| < 2 \\ 3a\left|\frac{x}{2}\right|^2 - 10a\left|\frac{x}{2}\right| + 8a & 2 \le |x| < 4 \\ 0 & 4 \le |x| \end{cases} \quad (8)$$

The method 1200 begins at step 1201, where the processor 1105 performs the step of determining a gradient amount $g_x$ in the horizontal direction for the isophote (e.g., 1010) using a separable continuous convolution where the stretched cubic kernel K(x,−0.5) determined in accordance with Equation (7) is applied in the vertical direction and the matching derivative kernel K'(x,−0.5) determined in accordance with Equation (8) is applied in the horizontal direction.

Then at the next step 1203, the processor 1105 performs the step of determining the vertical gradient amount $g_y$. The vertical gradient amount $g_y$ is determined for the isophote by applying the stretched cubic kernel K(x,−0.5) in the horizontal direction and then applying the matching derivative kernel K'(x,−0.5) in the vertical direction. Different kernels may also be used to determine an isophote orientation ($g_x$, $g_y$). While many gradient determination methods only generate results at the same resolution as the input, it is possible to interpolate such results using methods including bicubic interpolation to produce the gradient measurements required by the method 400 described above.

Figure 6:
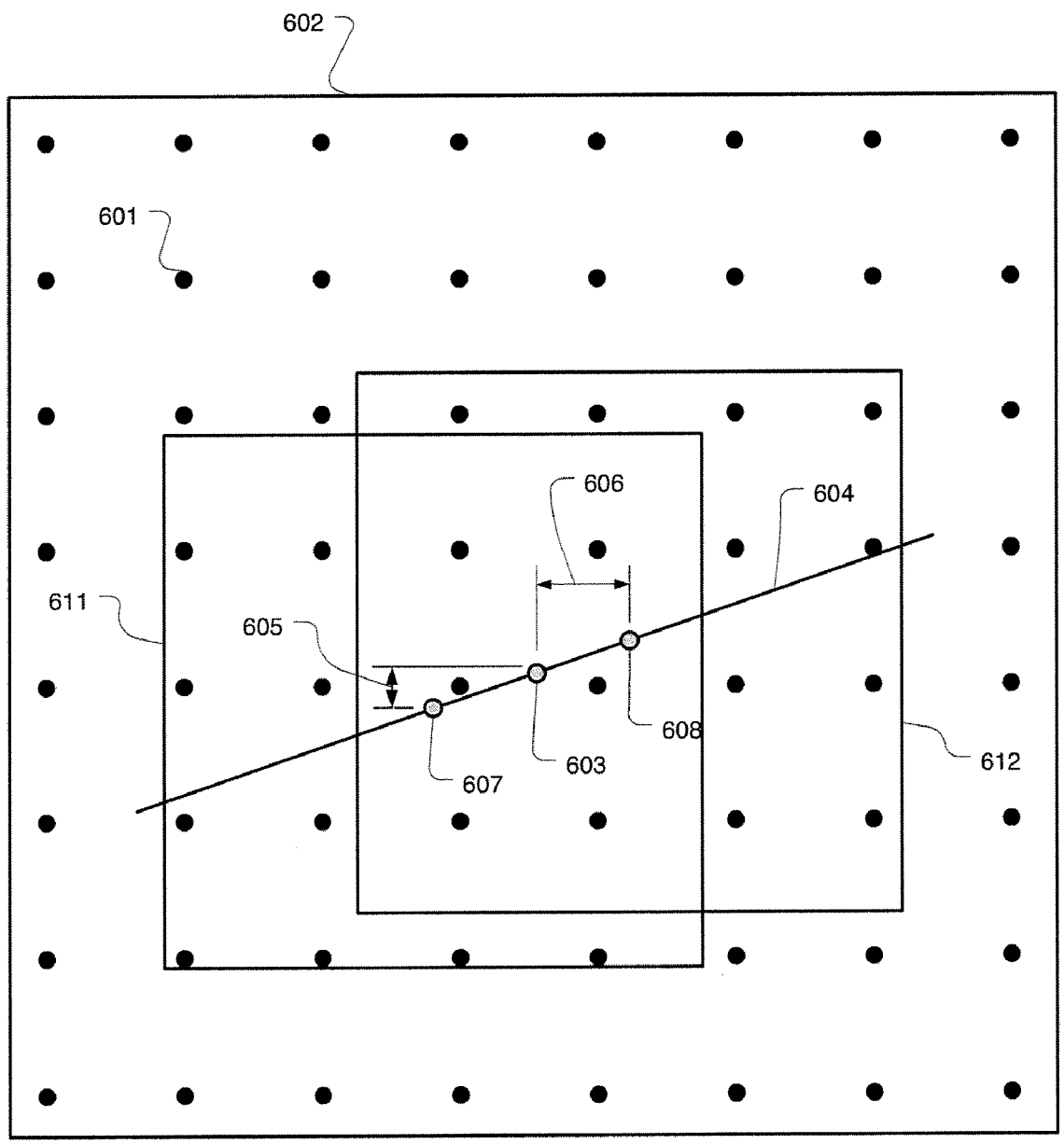
FIG. 6 is a diagram showing, in two dimensions, sets of sample pixel areas involved in applying the method of FIG. 4 to an image.

Steps 410 and 415 of the method 400 will now be further described with reference to an example, as shown in FIG. 6. FIG. 6 shows, in two dimensions, sets of sample pixel areas 602, 611 and 612 adapted for use in applying the method 400 to an image. As seen in FIG. 6, an 8×8 pixel area 602 centred at an output sample position 603 is used to determine an isophote orientation and period vector D for the output sample position 603. The two components of the period vector D are dx 606 and dy 605 and are used to determine locations of the auxiliary points $P_1$ 607 and $P_2$ 608. The auxiliary points are interpolated based on support pixel areas 611 and 612 respectively of the bicubic kernel and the image value at 603 is determined as the average of the values interpolated at $P_1$ 607 and $P_2$ 608.

In cases where the data to be interpolated contains complex structures and curved edges, the method 400 of FIG. 4 applied alone may result in artefacts. For example, as local orientation approaches horizontal or vertical then the length of the period vector D becomes infinite. Further, if the curvature of the isophote (e.g., 1010) is high then, one or both auxiliary points may not lie on the isophote through the point being interpolated. It is advantageous to revert to a standard, non-adaptive interpolation method such as bicubic when such complex structure and curved edge cases are encountered. When switching between interpolation methods it is desirable to transition gradually using a blend so as to reduce the possibility of visible artefacts at the point of switching.

The method 400 of FIG. 4 may be modified to take into account horizontal and vertical isophotes as well as local isophote curvature. A method 700 of determining a resampled image value at a sample position of an output image, which takes into account horizontal and vertical isophotes will now be described in detail with reference to FIG. 7. The method 700 may be implemented as software resident on the hard disk drive 1110 and being controlled in its execution by the processor 1105.

The method 700 begins at step 701 where the processor 1105 performs the step of determining the orientation of an isophote passing through the output sample position. The orientation is represented by the gradient ($g_x$, $g_y$) of the image intensity which is perpendicular to the isophote.

At the next step 702, the processor 1105 performs the step of determining a period of intensity variation along the isophote (i.e., the aliasing period 1040) as at step 415 of the method 400. As described above, the aliasing period (e.g., 1040) has components dy (e.g., 1025) and dx (e.g., 1026) in the vertical and horizontal directions, respectively.

Then at the next step 703, the processor 1105 uses the two components dy and dx of the period vector corresponding to the aliasing period to perform the step of determining two auxiliary points lying on the isophote passing through the output sample position, as at step 420 of the method 400.

Then in the following steps 710 to 780, the method 700 determines the image value at the sample position of the output image depending on the orientation and curvature of the isophote. In particular, at step 710, the processor 1105 performs the step of determining a first blend amount $\alpha_{hv}$ based on how close the isophote is to horizontal or vertical. Points on isophotes that are too close to horizontal or vertical are interpolated using bicubic interpolation in step 730. Step 710 will be described in further detail below with reference to FIGS. 8A and 8B.

After determining the first blend amount $\alpha_{hv}$ at step 710, at the next step 720, if the processor 1105 determines that the isophote orientation is close enough to horizontal or vertical to generate $\alpha_{hv}=0$, then it is not necessary to interpolate the input data at the auxiliary points and the method 700 proceeds to step 730. Otherwise, the method 700 proceeds to step 725.

At step 730, the processor 1105 performs the step of determining the image value at the sample position of the output image using bicubic interpolation, before the method 700 concludes.

At step 725, the processor 1105 performs the step of determining an interpolated value at each of the auxiliary points, using bicubic interpolation. At the next step 735, the processor 1105 performs the step of determining curvature of the isophote. As will be described below with reference to FIGS. 8A and 8B, the curvature of the isophote may be determined by determining a gradient vector at a first one of the auxiliary points; and then determining a difference between the gradient vector at the first one of the auxiliary points and a gradient vector at either a second one of the auxiliary points or at the sample position of the output image. As will also be described, a value referred to as an isophote orientation difference $c_{a,b}$ provides a useful estimation of curvature for any given pair of points. Since the curvature measure is calculated using gradients calculated at the auxiliary points, the neighbourhood used to determine the curvature is adapted to the orientation of the isophote.

Subsequently, at step 740 the processor 1105 determines a second blend amount $\alpha_{c,n}$ for each auxiliary point based on a measurement of local curvature. Then at step 750, if the processor 1105 determines that all the calculated blend amounts are equal to one (1), implying that no blending is required, then the method 700 proceeds directly to step 780. Otherwise, if blending is required then a bicubic interpolated estimate of the image value at the output sample position is determined at step 760.

At the next step 770, the interpolated value determined at step 760 is blended into the previously interpolated estimates of the auxiliary points. In particular, at step 770, a modified auxiliary point interpolation value is generated according to Equation (9) as follows:

$$\hat{p}_n = \alpha p_n + (1-\alpha) p_0 \qquad (9)$$

where $\hat{p}_n$ is the modified interpolation estimate for the nth auxiliary point, $p_n$ is the original bicubic estimate for the nth auxiliary point, $p_0$ is the interpolated estimate of the image value at the output sample position and $\alpha=\alpha_{hv}\alpha_{c,n}$ is the combined blend amount.

Subsequently at step 780, the processor 1105 performs the step of determining the resampled image value at the output sample position as the average of the modified auxiliary points determined at step 770.

Following step 780, the processor 1105 may perform the step of outputting the determined image value at the sample position of the output image. The determined image value may be stored in memory 1106, displayed on the display device 1114 or printed on the printer 1115, for example. Measurement of isophote curvature and the curvature based blend amount $\alpha_{c,n}$ will now be described further with reference to FIGS. 8A and 8B.

Figure 8A:
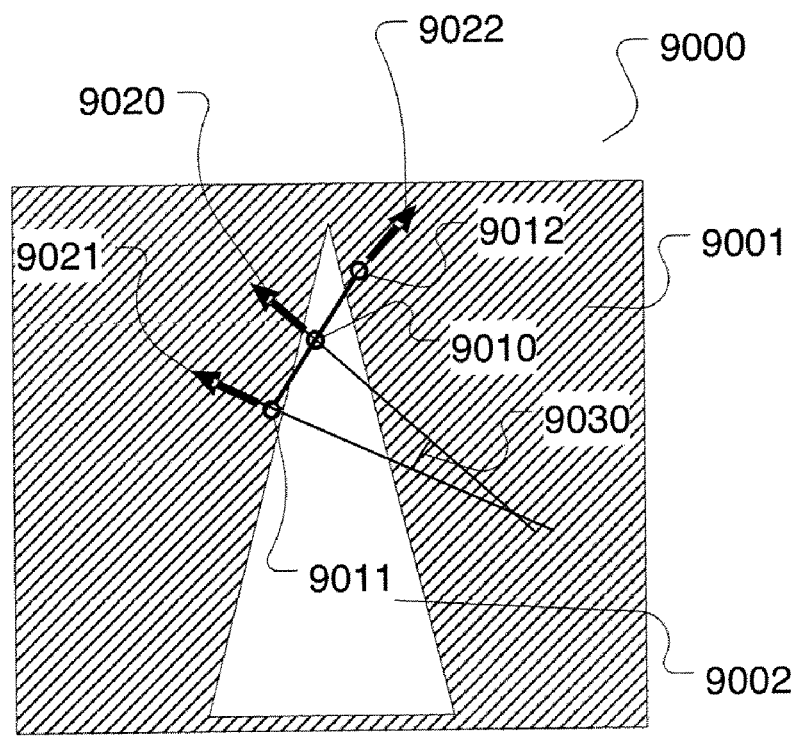
FIG. 8A shows an example image including a dark background and a foreground object with sharp corners.

FIG. 8A shows an image 9000 which includes a dark background 9001 and a foreground object 9002 with sharp corners. Overlayed on the object 9002 are three points including the point to be interpolated 9010 and two auxiliary points 9011 and 9012 along with their corresponding gradient vectors 9020, 9021 and 9022 respectively. For any pair of gradient vectors, curvature is defined as a function of the angle between the gradient vectors. The two points 9010 and 9011 will normally have slightly different orientations which result in their gradient vectors 9020 and 9021 intersecting at some non-zero angle 9030. An isophote orientation difference $c_{a,b}$ may be determined as the normalized magnitude of the vector difference of the gradient vectors $G_a$ and $G_b$ in accordance with Equation (10) below:

$$c_{a,b} = \frac{\|G_a - G_b\|}{\|G_a\| + \|G_b\|} \qquad (10)$$

where $\|G\|$ is the norm of the vector $G=(g_x, g_y)$ and is determined as $\|G\|=\sqrt{g_x^2+g_y^2}$.

When gradient vectors at the two auxiliary points have the same magnitude (i.e., $\|G_a\|=\|G_b\|$) then the orientation difference is approximately equal to the magnitude of the sine of half of the angle between the two vectors as described in Equation (11) as follows:

$$c_{a,b} \approx |\sin(\theta/2)| \qquad (11)$$

Figure 8B:
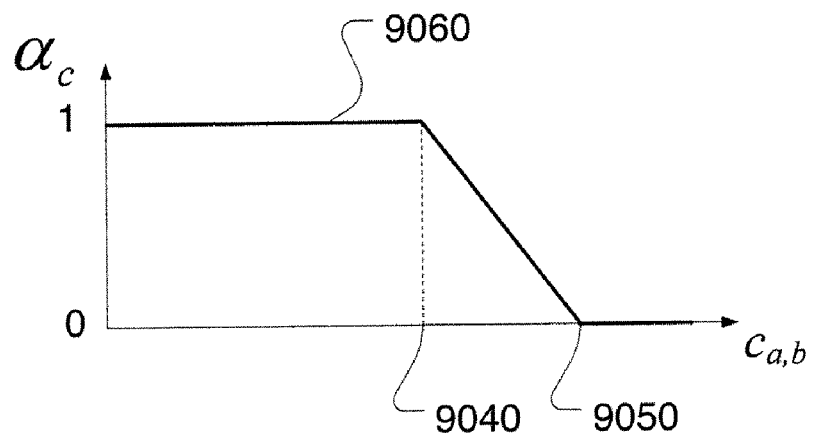
FIG. 8B shows a non-linear mapping of blend amount versus an isophote orientation difference.

Thus the isophote orientation difference $c_{a,b}$ therefore provides a useful estimation of curvature for any given pair of points for cases where $\|G_a\|+\|G_b\|\neq 0$. The isophote orientation difference $c_{a,b}$ also has the advantage, when compared to other known methods of determining local curvature, of being adapted to the isophote orientation such that that area over which curvature is determined is a function of the isophote orientation. This is due to the fact that the curvature estimate is based on the positions of the auxiliary points. From the isophote orientation difference $c_{a,b}$, a blend amount $\alpha_{a,b}$ may be determined using a simple non-linear mapping 9060, as seen in FIG. 8B, after determining two threshold points $k_d$ 9040 and $k_c$ 9050 in accordance with Equation (12) as follows:

$$\alpha_{a,b} = \begin{cases} 1 & c_{a,b} < k_d \\ \frac{k_c - c_{a,b}}{k_c - k_d} & k_d \leq c_{a,b} < k_c \\ 0 & c_{a,b} \geq k_c \end{cases} \qquad (12)$$

Figure 7:
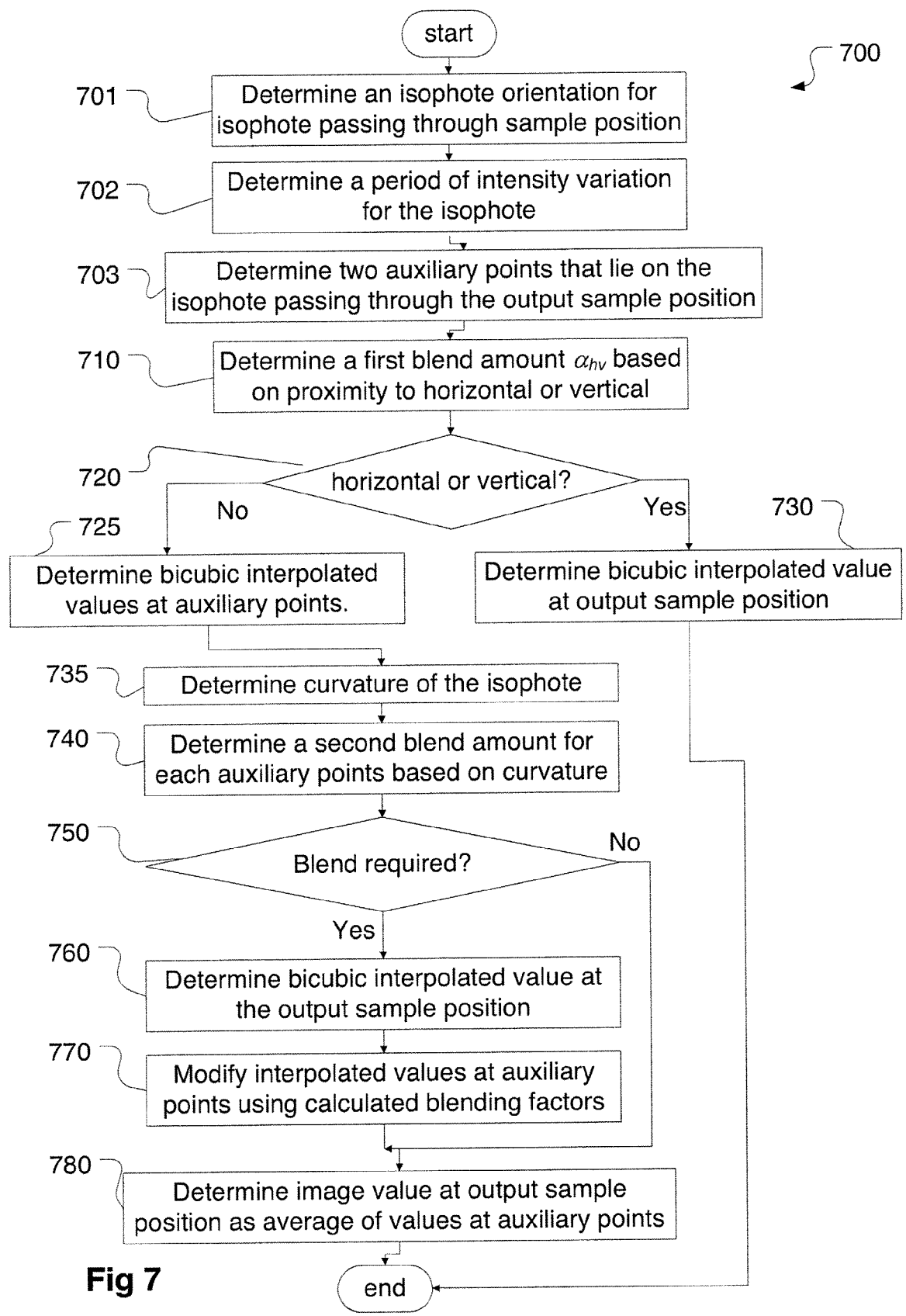
FIG. 7 is a flow diagram showing a method of determining a resample image value at a sample position in an output image.

The first blend amount $\alpha_{h,v}$ and second blend amount $\alpha_{c,n}$ used in the method 700 of FIG. 7 are $\alpha_{c,n}|n=1,2$ corresponding to each auxiliary point which are determined using Equations (10) and (12) by substituting the values for the gradient vectors at the sample position in the output image and the corresponding auxiliary point locations.

In one implementation, a single $\alpha_c$ value may be determined by considering the gradient vectors at the auxiliary points only. In this instance, the value of the threshold points $k_d$ and $k_c$ may be doubled and the blend amount applied to both auxiliary points using Equation (9).

The magnitude of the period vector becomes infinite as the isophote orientation approaches horizontal or vertical. Accordingly, the range of orientations may be restricted according to the size of a data window that is available for processing. A measure $d_{h,v}$ indicating how far inside a parent window the interpolation processing will be, may be determined. Measurement of $d_{h,v}$ and derivation of a corresponding blend amount $\alpha_{h,v}$ will now be described in detail with reference to FIGS. 9A and 9B.

Figure 9A:
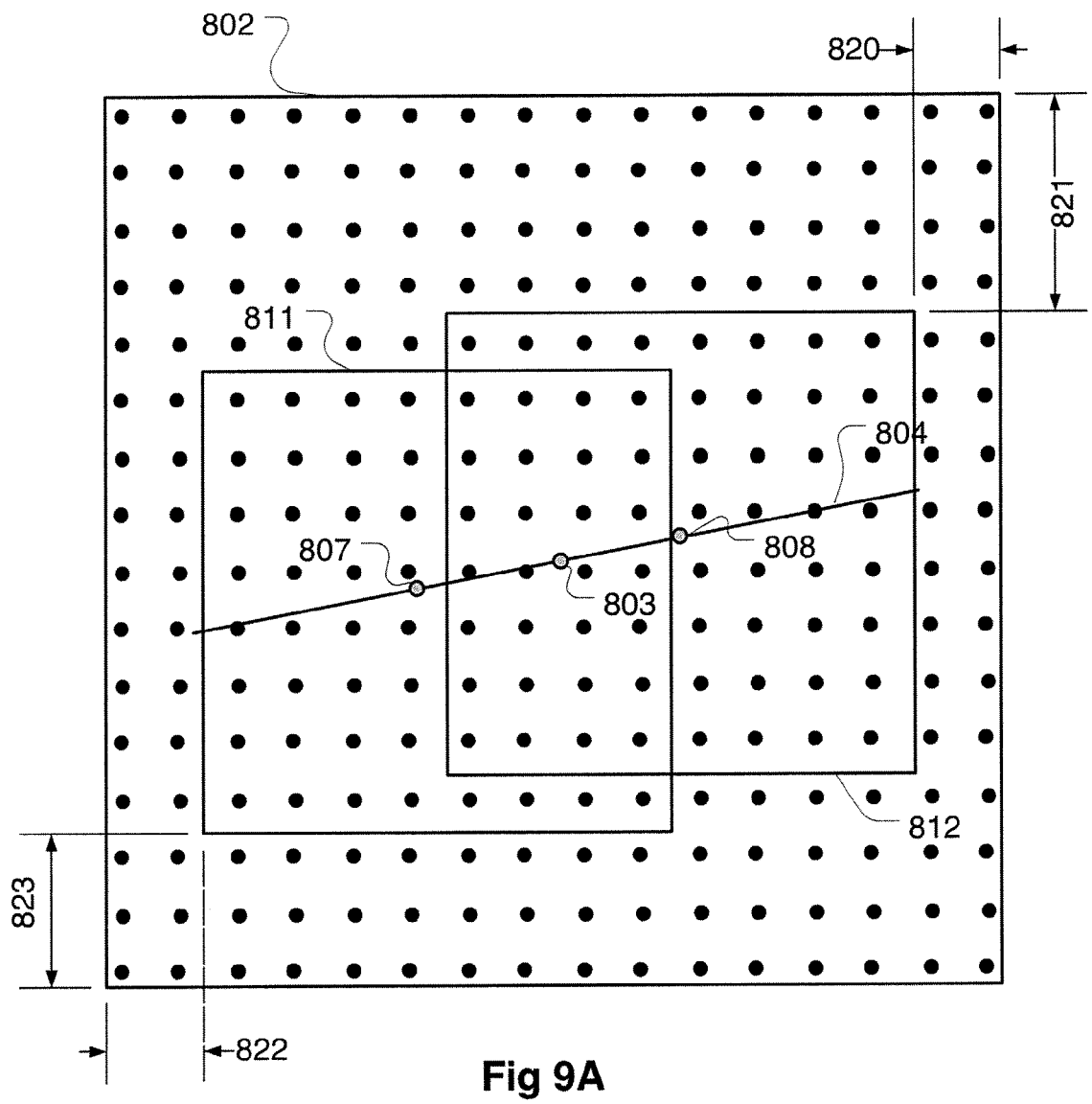
FIG. 9A shows a window of data which may be used for determining an output sample.

FIG. 9A shows a window of data 802 which may be used for determining an output sample at position 803. The window 802 has been expanded to enable determination of gradient vectors at each auxiliary point 807 and 808 lying on the isophote 804 through the output position 803. These gradient vector determinations require access to the blocks of pixels 811 and 812 respectively. The window 802 is determined to be at least large enough to contain the support pixel areas 811 and 812 for an isophote orientated at 45° (degrees) with respect to an input sample grid axes. In the example of FIG. 9A, a 16×16 window is used for an 8×8 gradient window. The bounding window 802 size may be varied based on processing constraints. Further, the window 802 need not be square and may be any suitable shape. For example, if a row buffer is used to cache pixel data a wider window may be preferable. The distance from the outside edge of block 812 and the bounding window 802 is the distance 820 in the horizontal direction and 821 in the vertical direction. The block 811 has corresponding distances 822 and 823. For near horizontal isophote orientations, the distances 820 and 822 are equal. This distance may be denoted $d_{h,v}$. A distance of one (1) corresponds to the distance between samples in the input image (independently in the horizontal or vertical directions).

Figure 9B:
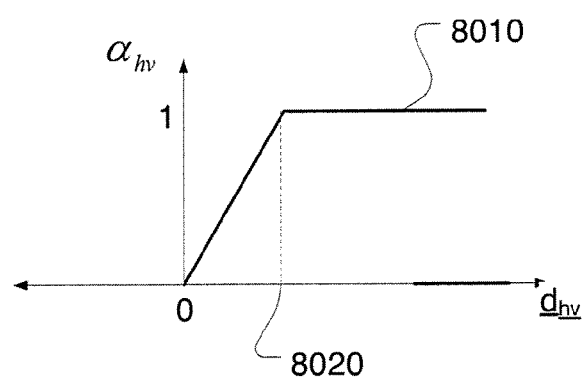
FIG. 9B shows a non-linear mapping of blend amount versus an distance between outside edge of a block and a bounding window.

The distance $d_{h,v}$ may be determined to a fraction of the size of a pixel, which is aided by the fact that the output and auxiliary point locations are also determined to a fraction of the size of an input pixel by interpolation. For near vertical isophote orientations, the distances 821 and 823 are equal and may be used to determine $d_{h,v}$ instead of the distances 820 and 822. If the outside edge of blocks 811 or 812 lie outside of the bounding window 802 then $d_{h,v}$ is negative. A blend amount $\alpha_{h,v}$ may be determined from $d_{h,v}$ using a simple non-linear mapping 8010, as seen in FIG. 9B, after determining a threshold point $I_d$ 8020 defining the start of the transition. The blend amount may be determined in accordance with Equation (13) as follows:

$$\alpha_{hv} = \begin{cases} 1 & d_{hv} > l_d \\ \dfrac{d_{hv}}{l_d} & l_d \geq d_{hv} > 0 \\ 0 & d_{hv} \leq 0 \end{cases} \quad (13)$$

Figure 10:
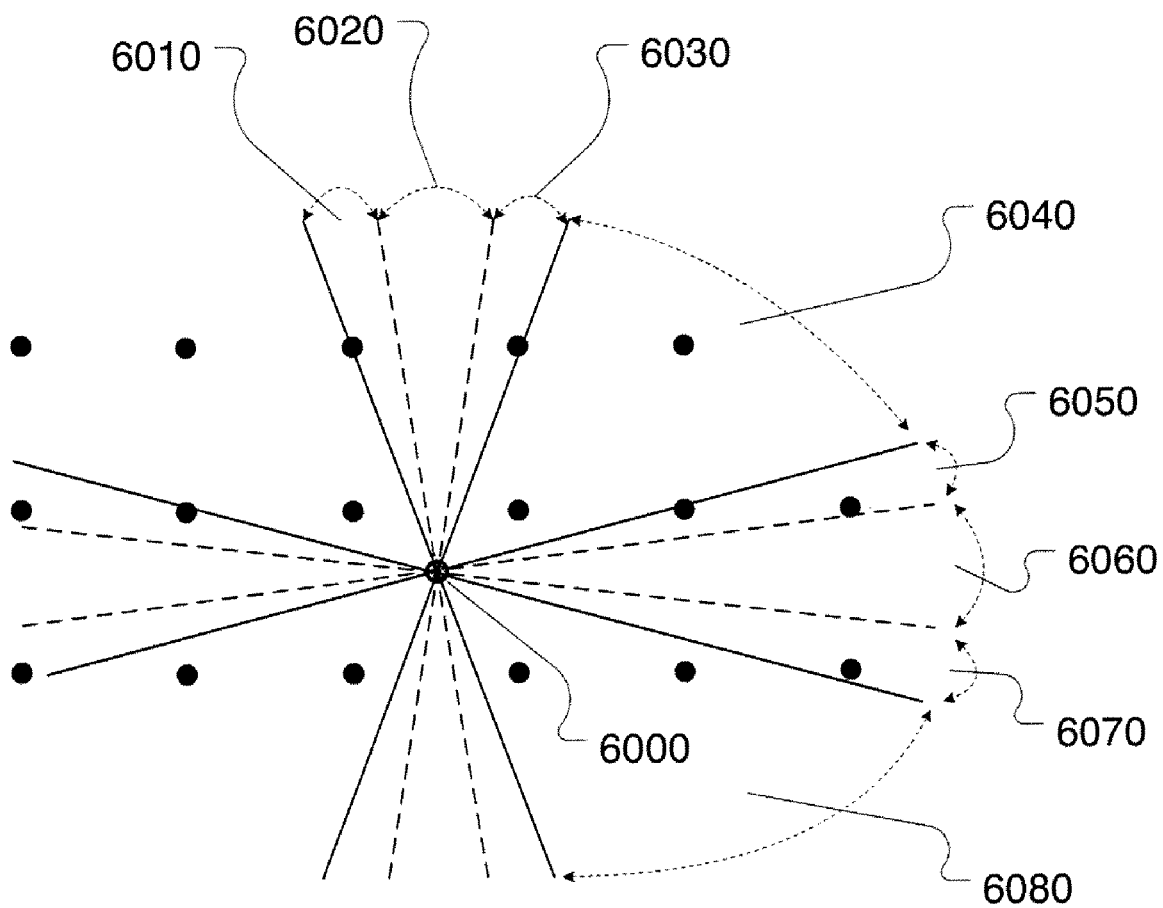
FIG. 10 shows an output sample position with a plurality of isophotes.

Adaptation to horizontal and vertical isophotes will now be explained further with reference to FIG. 10. FIG. 10 shows an output sample position 6000. Isophotes oriented in the ranges 6020 and 6060 may be interpolated using a bicubic interpolation method while isophotes oriented in the ranges 6040 and 6080 may be interpolated using the method 400 described above. For intermediate orientation ranges 6010, 6030, 6050 and 6070, the output sample position may be a smoothly varying blend between bicubic interpolation and the edge reconstructing method 400. The above formulation of $\alpha_{h,v}$ in Equation (13) does not vary linearly with orientation in the transition region, nor is $\alpha_{h,v}$ a smooth function. Alternative functions for $\alpha_{h,v}$ may be used.

Industrial Applicability

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive. For example, it is possible to use the described methods for filtering without resampling. This might be useful for example for post-processing an up-sampled image to remove jaggie artefacts. In this case the aliasing period will be a function of both the isophote orientation and prior up-sampling rate. If the prior up-sampling rate is not known in advance, an additional step may be required to estimate the aliasing period along the isophote orientation at each point in the image. An orientation specific, periodic variation in intensity may be observed along lines corresponding to isophotes in an "ideal" image and a filter method may be applied that specifically suppresses variation at this frequency along the isophote lines.

Bicubic interpolation has been used above due to its widely acknowledged quality when used with natural images. In some cases, other methods such as bilinear interpolation may be preferable and may be used with suitable variation in window sizes. In general any interpolation method may be used within the context of the described methods.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of determining an image value at a sample position of an output image, said method comprising steps of:
   determining an orientation of an isophote passing through a sample position of an output image;
   determining a period of intensity variation along the isophote;
   calculating interpolated values for two auxiliary points, each auxiliary point having a location dependent on the determined orientation and the determined period of intensity variation;
   determining an image value at the sample position of the output image based on the interpolated values at the auxiliary points; and
   outputting the determined image value at the sample position of the output image.

2. The method of claim 1, further comprising a step of determining an average of the interpolated values at the two auxiliary points,
   wherein the two auxiliary points are separated by a distance equal to half of the period of intensity variation along the isophote.

3. The method of claim 2, wherein the interpolated values at the two auxiliary points are determined using bicubic interpolation.

4. A method of determining an image value at a sample position of an output image, said method comprising steps of:
- determining an orientation of an isophote passing through a sample position of an output image;
- determining a period of intensity variation along the isophote;
- determining a curvature of the isophote in a neighbourhood of the sample position of the output image based on the determined period of intensity variation;
- determining an image value at the sample position of the output image depending on whether the determined curvature is within a first range or a second range; and
- outputting the determined image value at the sample position of the output image.

5. The method of claim 4, wherein the determining of the curvature of the isophote uses a neighbourhood size that is related to the determined period of intensity variation along the isophote.

6. The method of claim 5, further comprising steps of:
- determining two auxiliary points separated by a distance equal to half of the determined period of intensity variation along the isophote; and
- determining an average of interpolated values at the two auxiliary points.

7. The method of claim 6, further comprising steps of:
- determining a gradient vector at a first one of the auxiliary points; and
- determining a difference between the determined gradient vector at the first one of the auxiliary points and a gradient vector at a second one of the auxiliary points.

8. The method of claim 6, further comprising steps of:
- determining a gradient vector at a first one of the auxiliary points; and
- determining a difference between the determined gradient vector at the first one of the auxiliary points and a gradient vector at the sample position of the output image.

9. An apparatus for determining an image value at a sample position of an output image, said apparatus comprising:
- an orientation determination device, which determines an orientation of an isophote passing through a sample position of an output image;
- a period determination device, which determines a period of intensity variation along the isophote;
- a calculator, which calculates interpolated values for two auxiliary points, each auxiliary point having a location dependent on the orientation and the period of intensity variation;
- a value determination device, which determines an image value at the sample position of the output image based on the interpolated values at the auxiliary points; and
- an output device, which outputs the image value at the sample position of the output image.

10. An apparatus for determining an image value at a sample position of an output image, said apparatus comprising:
- an orientation determination device, which determines an orientation of an isophote passing through a sample position of an output image;
- a period determination device, which determines a period of intensity variation along the isophote;
- a curvature determination device, which determines a curvature of the isophote in a neighbourhood of the sample position of the output image based on the period of intensity variation;
- a value determination device, which determines an image value at the sample position of the output image depending on whether the curvature is within a first range or a second range; and
- an output device, which outputs the image value at the sample position of the output image.

11. A non-transitory computer-readable storage medium storing a program that when executed by a computer causes the computer to perform a method for determining an image value at a sample position of an output image, said method comprising steps of:
- determining an orientation of an isophote passing through a sample position of an output image;
- determining a period of intensity variation along the isophote;
- calculating interpolated values for two auxiliary points, each auxiliary point having a location dependent on the determined orientation and the determined period of intensity variation;
- determining an image value at the sample position of the output image based on the interpolated values at the auxiliary points; and
- outputting the determined image value at the sample position of the output image.

12. A non-transitory computer-readable storage medium storing a program that when executed by a computer causes a computer to perform a method for determining an image value at a sample position of an output image, the process comprising steps of:
- determining an orientation of an isophote passing through a sample position of an output image;
- determining a period of intensity variation along the isophote;
- determining a curvature of the isophote in a neighbourhood of the sample position of the output image based on the determined period of intensity variation;
- determining an image value at the sample position of the output image depending on whether the determined curvature is within a first range or a second range; and
- outputting the determined image value at the sample position of the output image.

13. A system for determining an image value at a sample position of an output image, said system comprising:
- a memory for storing data and a computer program; and
- a processor coupled to said memory, for executing the computer program, the computer program including instructions for:
  - determining an orientation of an isophote passing through a sample position of an output image;
  - determining a period of intensity variation along the isophote;
  - calculating interpolated values for two auxiliary points, each auxiliary point having a location dependent on the determined orientation and the determined period of intensity variation;
  - determining an image value at the sample position of the output image based on the interpolated values at the auxiliary points; and
  - outputting the determined image value at the sample position of the output image.

14. A system for determining an image value at a sample position of an output image, said system comprising:
- a memory for storing data and a computer program; and
- a processor coupled to said memory, for executing the computer program, the computer program including instructions for:

determining an orientation of an isophote passing through a sample position of an output image;

determining a period of intensity variation along the isophote;

determining a curvature of the isophote in a neighbourhood of the sample position of the output image based on the determined period of intensity variation;

determining an image value at the sample position of the output image depending on whether the determined curvature is within a first range or a second range; and outputting the determined image value at the sample position of the output image.

* * * * *